United States Patent [19]
Dewitte et al.

[11] Patent Number: 4,957,572
[45] Date of Patent: Sep. 18, 1990

[54] METHOD AND APPARATUS FOR THE PRODUCTION OF A BEAD OF ORGANIC MATERIAL INTENDED TO SERVE AS A SEAL AND INSERT IN A MULTIPLE GLAZING

[75] Inventors: Philippe Dewitte, Thourotte; Michel Canaud, Paris; René Poix, Noyon, all of France

[73] Assignee: Saint-Gobain Vitrage, Courbevoie, France

[21] Appl. No.: 361,352

[22] Filed: Jun. 5, 1989

[30] Foreign Application Priority Data
Jun. 17, 1988 [FR] France ................ 88 08135

[51] Int. Cl.$^5$ ............................ B32B 31/12
[52] U.S. Cl. ........................ 156/109; 118/302;
118/429; 137/13; 156/292; 222/146.5; 417/61;
417/707; 427/287; 427/422
[58] Field of Search .............. 118/271, 302, 429;
137/13; 156/109, 292; 222/146.2, 146.5;
417/61, 207; 427/284, 287, 422

[56] References Cited
U.S. PATENT DOCUMENTS

| 3,412,903 | 11/1968 | Riper et al. | 222/146.1 X |
| 4,024,854 | 5/1977 | Park et al. | 222/146.2 X |
| 4,073,409 | 2/1978 | Gardner et al. | 222/146.5 |
| 4,696,256 | 9/1987 | Lenhardt | 156/109 X |
| 4,714,425 | 12/1987 | Lenhardt | 156/109 X |
| 4,790,458 | 12/1988 | Moore | 222/146.5 X |

FOREIGN PATENT DOCUMENTS

| 233519 | 8/1987 | European Pat. Off. . |
| 8633671 | 2/1988 | Fed. Rep. of Germany . |
| 2426561 | 12/1979 | France . |
| 675569 | 7/1952 | United Kingdom . |
| 2049815 | 12/1980 | United Kingdom . |

Primary Examiner—Robert A. Dawson
Attorney, Agent, or Firm—Oblon, Spivak, McClelland, Maier & Neustadt

[57] ABSTRACT

In order to form a bead of organic material having a butyl rubber base and a viscosity greater than 35000 poises, the material in a drum is heated and pumped by a reciprocating pump and delivered to an output nozzle via a conduit. A lock chamber in the conduit is delimited by valves. A variable volume chamber connected to the lock chamber or upstream of the lock chamber is able to selectively take in or discharge organic material for maintaining a constant pressure at the nozzle.

17 Claims, 2 Drawing Sheets

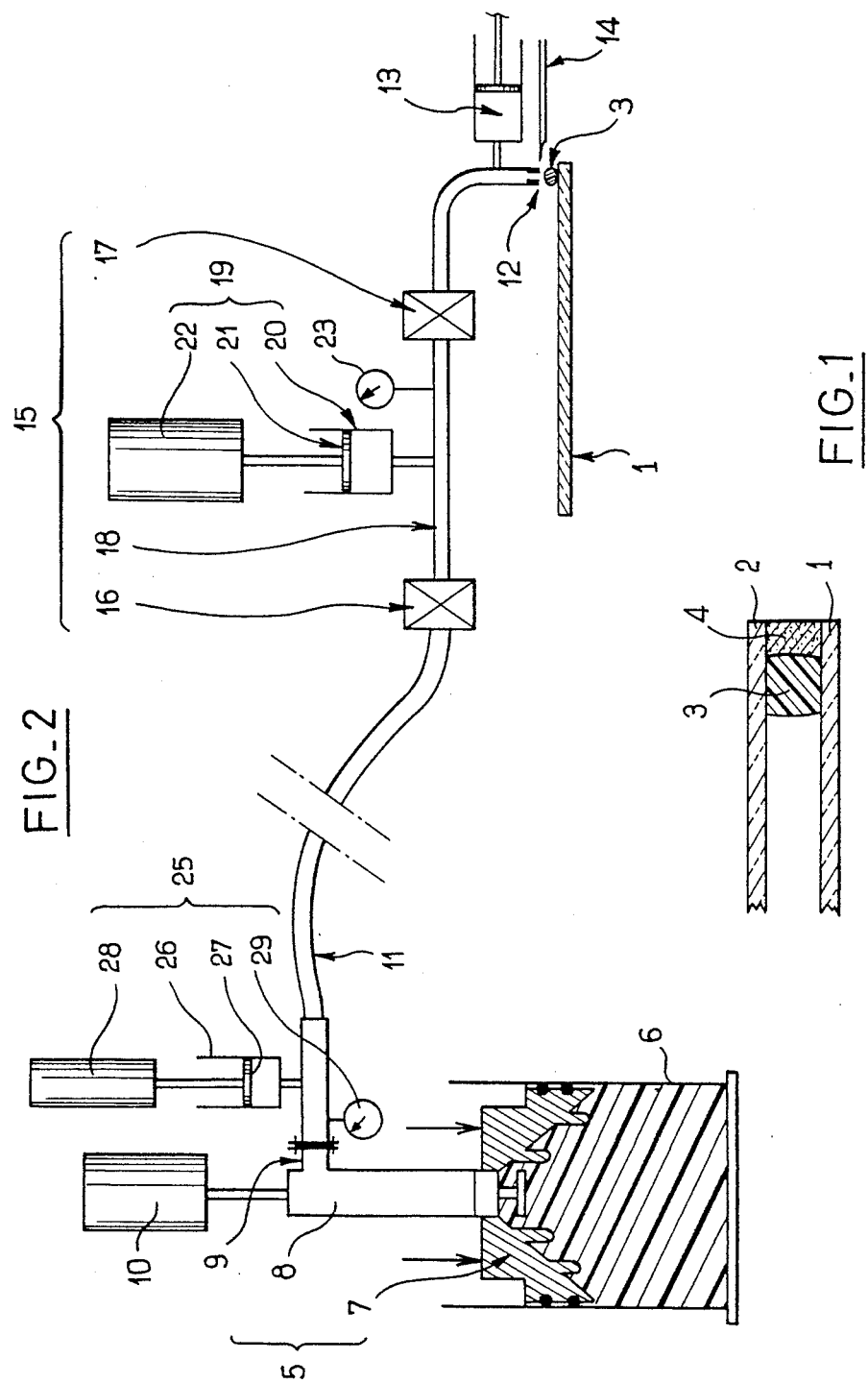

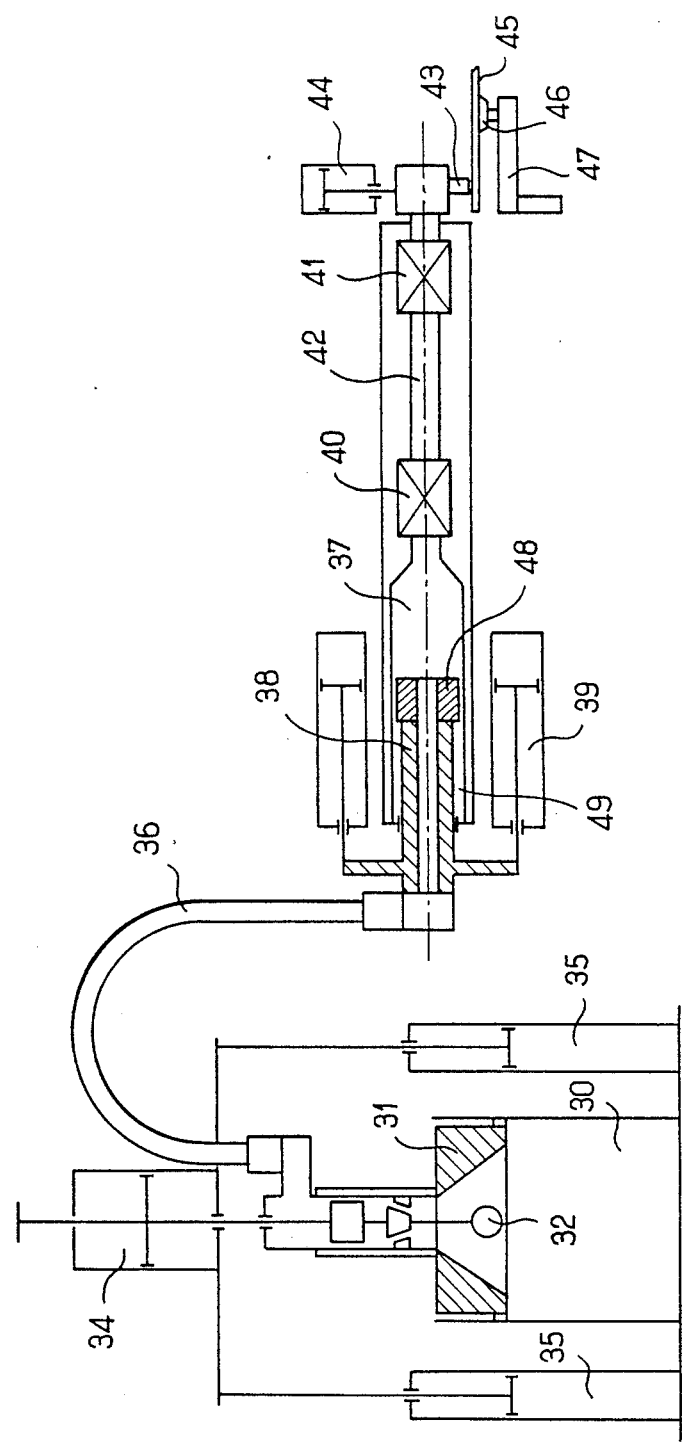
FIG_3

METHOD AND APPARATUS FOR THE PRODUCTION OF A BEAD OF ORGANIC MATERIAL INTENDED TO SERVE AS A SEAL AND INSERT IN A MULTIPLE GLAZING

BACKGROUND OF THE INVENTION

1. Field of the Invention

This invention relates to the production of multiple glazings with seals of organic material and more particularly pumping and distribution of these organic materials to provide a continuous bead intended to serve as a seal and insert between two consecutive glass sheets of a multiple glazing.

2. Discussion of the Background Art

It is known from French patent application FR-A-No. 2294313 to produce a continuous bead of material of the butyl rubber type and to deposit it on a glass sheet during formation of a multiple glazing after adding a second glass sheet. To make this bead, a screw extruder is fed with slabs of organic material each about 7 kg, one slab being used while the other one is being preheated to be used next. Consequently there is a need for the constant presence of a person responsible for feeding the screw extruder with new slabs.

Moreover, the extruder is a heavy and quite powerful machine, and consequently rather expensive, because of the high performance that is required for correct extrusion, which requires a stop of the extrusion at each corner of the glazing and a restarting each time with an immediately constant output.

Further, it is known from European patent application EP-A No. 171309 to produce this continuous bead by extruding the organic material with a pump dipping directly into a large-capacity drum filled with said material, to subject this material to various operations concurrently to lower its viscosity and to make possible the formation of a uniform continuous bead able, if necessary, to be of great length and/or great height for making large-sized multiple glazings and with an air space of great thickness between the glass sheets. These various operations which make possible the formation of a continuous bead of great length and/or great height use a first pump, then a gear pump, then a variable volume reserve and in general an entire series of devices which make the installation expensive, complex and which complicate control of the temperature of the treated material.

There is generally known from European patent application EP-A-No. 238380 a reciprocating pump dipping into the drum of organic material, associated with a conical heating plate resting on the material contained in the drum, this unit being able to provide a high and continuous delivery of organic material, even a material as viscous and as hard to pump as butyl rubber. But with such a reciprocating pump the problem arises of perfect regularity of the delivery at the moment of change of direction of the pump. Since the space between two consecutive glass sheets of the multiple glazing, or in other words the thickness of the enclosed layer of gas, generally air, depends directly on the thickness and regularity of the thickness of the bead placed between said two glass sheets, and since the insulation performance of the multiple glazing and its aptitude for remaining perfectly transparent without moisture between the glass sheets, depend on the tightness of the seals between the glass sheets and in particular the tightness and regularity of the bead of the butyl rubber type, it is important that there be a perfect quality of the bead forming the seal and insert if well-calibrated glazings having good performance are desired. Further, with thick insert air layers, the delivery provided by the pump can be momentarily insufficient, even when its average delivery is greater than the theoretical necessary delivery rate.

SUMMARY OF THE INVENTION

This invention has as an object to provide a bead of organic material of the butyl rubber type, or more generally a bead of a material with a high viscosity, with all the advantages and performance of the known installations but without the drawbacks of said installations.

The invention has as a further object a uniform delivery of material, which can be great if desired with a simple device, that is inexpensive both from the investment viewpoint and from the viewpoint of maintenance or aid to operation, for the production of continuous beads for large-sized multiple glazings with thick air layers.

Yet a further object of the invention is the treatment of organic material which is initially highly viscous such that the temperature of this material is well controlled all through the process that leads to the final bead, so as not to cause, by excessive mixing, shearing or an excessive elevation of temperature which would result in a deterioration of the intrinsic qualities of the material.

For this purpose, there is proposed a process for producing a regular bead of organic material of the butyl rubber type, with a high viscosity greater than 35000 poises (35000 Pa.s), comprising pumping the raw material in a drum with the help of a conical heating piston/reciprocating pump unit, conducting the pumped material by a pipe to an output nozzle by inserting in the immediate vicinity of the output nozzle a compression/decompression unit and according to which there is inserted in the vicinity of the output nozzle a lock chamber limited by at least one input valve and one output valve. The lock chamber makes it possible to maintain in the vicinity of the output nozzle a certain amount of available material, already under pressure so that this material is immediately available as soon as necessary. Advantageously, the pressure of the material in this lock chamber is regulated.

The apparatus according to the invention includes a reciprocating pump having a conical heating piston which may rest on the organic material at a drum for heating and pumping the organic material, an output nozzle, a conduit connecting an output of the reciprocating pump with the output nozzle, and upstream and downstream valves in the conduit, for defining a lock chamber in the conduit at a position between the upstream and downstream valves.

According to a first embodiment of the invention, regulation of the pressure is obtained by a regulating unit consisting essentially of an accumulator/compensator shunt-connected to the lock chamber, formed by a chamber closed by a piston operated as a function of the pressure detected by a pressure gage. Thus, regardless of the input pressure in the material lock chamber, the output pressure is regulated. In this case, the lock chamber can be fed material directly by the pumping unit mounted on the drum.

This embodiment is improved by a regulation of the pressure of the material provided by the reciprocating pump, which is obtained, for example, by providing a second accumulator/compensator unit, shunt-connected on the pipe upstream from the lock chamber.

When considerable deliveries are necessary, for example, for making large-sized glazings with, in addition, very thick insert air layers, this first embodiment has the drawback of functioning correctly only if an accumulation chamber is available whose volume is sufficient to store the amount of material necessary for a given glazing, which supposes cylinders dimensioned accordingly and particularly large hydraulic power.

Under these conditions, there is a second embodiment of the invention according to which the pressure in the lock chamber is regulated not by a shunt-connected regulating unit but by a complete regulation of the delivery provided at the input of the lock chamber. For this purpose, the lock chamber is fed by an extrusion chamber closed by a piston preferably operated by two pistons operated as a constant-flow pump. The reciprocating pump mounted on the drum then serves only for force feeding the extrusion chamber, the delivery—and the pressure—of the material necessary for extrusion being provided directly by the piston of the extrusion chamber. In this embodiment, the reciprocating pump delivers only when the lock chamber is closed, i.e., when the nozzle is in a waiting position. Preferably the volume of the extrusion chamber is sufficient to produce several beads without resorting to the reciprocating pump on the drum, in order to allow replacement of a drum without interrupting production.

Advantageously, the feed circuit of the extrusion nozzle comprises not one but two extrusion chambers connected in parallel, each chamber being closed at its end opposite the reciprocating pump by a valve alternately functioning as an input valve of the lock chamber. In this way, an extrusion chamber can be filled by the reciprocating pump while the other chamber feeds the lock chamber, which makes possible very large delivery rate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a sectional view of a multiple glazing with organic seals of the type that can be produced by the installation according to the invention;

FIG. 2 is a schematic illustration of the installation for production of a plastic bead according to the first embodiment of the invention; and FIG. 3 is a schematic illustration of the installation for production of a plastic bead according to the second embodiment of the invention.

DETAILED DESCRIPTION OF THE PREFERRED EMBODIMENTS

The installation according to the invention is particularly useful for producing a bead of organic material of the butyl rubber type intended to go into the composition of a multiple glazing with organic seals of the type shown schematically in FIG. 1 and marketed by SAINT-GOBAIN VITRAGE under the trademark "BIVER".

Such a multiple glazing, for example a double glazing, consists of two glass plates 1 and 2 assembled to be spaced at a certain distance from one another by seals 3 and 4 of organic material which also perform the function of inserts or spacers for glass plates 1 and 2.

First seal 3 is of a material of the butyl rubber type having various ingredients which give it the particular properties of a predetermined mechanical strength, a predetermined elasticity, a predetermined adhesiveness, and a capacity for absorbing water vapor and various other effluents. More precise compositions of the organic material of this seal 3 may be found in French Pat. Nos. 2294314 and 2294313.

This seal 3 is deposited in the form of a calibrated continuous bead on the periphery of a glass plate, for example, plate 1. The two ends of this bead are joined to constitute a continuous band. Then a second glass plate is applied to this bead, thus enclosing an air layer between two glass plates 1 and 2 and bead seal 3.

This bead 3 acts only as a spacer of the two glass plates during the first phase of production of the multiple glazing, i.e., before emplacing second seal 4, and it especially determines the height of the enclosed air layer.

Further, because its composition is based on organic materials, which are essentially tight to water vapor, it helps to seal the multiple glazing.

Therefore, it is important that the bead which forms seal 3, deposited on a glass plate during production of a multiple glazing, exhibit a shape, in particular a height, that is well defined to guarantee a correct thickness of the enclosed air layer and consequently the overall thickness of the multiple glazing, and that it also exhibit a perfect uniformity of shape and more particularly of height over its entire length so that glass plates 1 and 2 rest in an identical way along their entire periphery on bead 3, thus assuring a faultless sealing over the entire periphery.

With this bead-shaped seal 3 being deposited and a second glass plate put in place, a second seal 4 is poured, injected or generally put in place regardless of the means used, in the groove formed by the edges of two glass sheets 1 and 2 and having bead seal 3 as a bottom, over the entire periphery of the glazing. This second seal 4, after optional polymerization, participates with first seal 3 in sealing the glazing and in maintaining the glass plates assembled and spaced at the distance defined by seal 3. This seal 4 can be of polysulfide, polyurethane, etc.

The installation shown in FIG. 2 produces this uniformity and at the same time provides enough delivery to make large-sized glazings, with a thick air layer, the amount of material forming seal 3 in this case being provided in a large amount without the slightest interruption and with the uniformity mentioned above.

A possible poor quality of the glazing can result in the entry of water vapor inside said glazing, followed by, under certain temperature conditions, condensation of this water vapor and its deposit in the form of moisture droplets on the inside faces of glass plates 1 and/or 2. The droplets are impossible to dry because of their position inside the glazing. This condensation prevents clear vision through the glazing, and decreases the insulating properties of said glazing.

Considering that the glazings in a structure must have a long life—indeed, they may be covered by a ten-year warranty—it is important that the quality of bead seal 3, which in great part governs the quality of the entire glazing, be perfect and remain so over time.

The installation of FIG. 2 makes it possible to obtain this quality and performance with a low equipment cost, maintenance and care, and excellent reliability.

This installation comprises a unit 5 for pumping the raw material in a drum 6. The unit 5 includes a conical heating plate 7 mounted on drum 6 and resting against the organic material contained in said drum, and a double-action reciprocating pump 8 pumping the organic material in the conical end of plate 7 and delivering the pumped material at its output end 9. Conical heating plate 7, reciprocating pump 8 and their combination are described in European Pat. Nos. 171309, 238380, already cited.

Pump 8 is operated by fluid cylinder 10. To output 9 of pump 8 is connected a pipe 11 leading to a nozzle 12 which provides bead 3 deposited directly on a glass plate for making a multiple glazing.

Pipe 11 is preferably flexible over most of its length. It is connected, for example, as described in European Pat. No. 251929.

This installation also has a compression/decompression system 13 mounted immediately upstream from nozzle 12 and making it possible to obtain immediate stopping or starting of the supply of bead 3 when desired, for example when, after bead 3 is deposited along one side of a glass plate the supply of the bead is stopped at the corner of the glass plate, but without cutting said bead, and said plate is turned or the nozzle is turned relative to said glass plate, followed by continued depositing of the bead 3 along the following side. Such a compression/decompression system 13 is described, as is its mode of operation, in the French Pat. No. FR-2207799.

The installation can also be equipped at its end, at a position outside of nozzle 12, with a bead-cutting blade 14 actuated by a cylinder (not shown) and responsible for cutting bead 3 when said bead has been delivered over the entire periphery of a glazing. Such a bead cutter is described in the French patent FR2207799.

This installation also includes in the vicinity of nozzle 12, on pipe 11, a lock chamber 15 limited by two valves, an upstream valve 16, and a downstream valve 17 and formed by a portion of pipe 18 equipped with a pressure regulator 19 for the organic material in said portion 18 of the pipe.

This pressure regulator 19 includes, in shuntconnection with portion 18 of the pipe, an accumulator/compensator, i.e., a variable volume chamber 20 in which a piston 21 moves under the action of a fluid cylinder 22, for example a pneumatic cylinder, controlled by a pressure gage 23 with a detected pressure threshold; when the threshold is passed, cylinder 22 is actuated or stopped.

Considering the high pressures present in pipe 11, i.e., several hundred bars, valves 16 and 17 are advantageously operated by a hydraulic rotary cylinder with high torque; this is true at least for nozzle 16 located on the side where the pressure is the highest, optionally a simple linear fluid cylinder may be used for valve 17. These cylinders are not shown in the figures.

The position of the accumulator/compensator 19 along the length of portion 18 of the pipe is adjustable; this accumulator/compensator is mounted, for example, on the shunt connected approximately in the middle portion of pipe portion 18.

The length of portion 18 also influences the quality of the results; the optimal length is defined as a function of the working pressures, the nature of the organic material, etc. For working pressures around 150 bars, the pressure upstream from the pump output is around 350 bars for a butyl rubber type material as defined more precisely in the French Pat. documents already cited as FR-No. 2294314 and 2294313, the length of portion 18 is on the order of 40 cm to 1 m and preferably 50 to 60 cm.

Advantageously, to make possible a precise regulation of the deliveries and pressures of the material at the output of nozzle 12, a section pressure regulation unit 25 is installed at the output of pump 8, at the input of pipe 11. This unit 25 includes another pressure accumulator/compensator, i.e., a variable volume cylinder 26 in which a piston 27 moves under the effect of a fluid cylinder 28, for example a pneumatic cylinder, controlled by a pressure gage 29 having two detected pressure thresholds.

The installation functions as described below: pumping unit 5 is mounted on a drum 6 of organic material constituting seal 3 of the multiple glazings, particularly a material with a butyl rubber. Conical heating plate 7 of this unit 5 is pressed against the material contained in drum 6. As described more precisely in the patent documents already cited (i.e., EP No. 171 309 and EP No. 238 380), taking into account the pressure, the particular shape of plate 7 and the amount of heating, some slightly softened organic material flows toward the tip of plate 7 where it is pumped by pump 8. The pumped material is supplied through output 9 with a satisfactory delivery rate having a certain uniformity, but insufficient for the contemplated application essentially because of the change of direction of the piston of pump 8. The functioning of pump 8 is regulated to provide at output 9 a certain pressure, for example on the order of 350 bars, in order to have at the output of the installation, i.e., at the output of nozzle 12, a pressure of organic material acceptable for the contemplated application. This pressure is a function of the relative displacement speed of the glass plates relative to nozzle 12 when the bead seal 3 is deposited on said glass plates, of the necessary bead height, etc., and, for example, is on the order of 150 bars for glass passing speeds on the order of some thirty cm/s.

In the delivery period, the two valves 16 and 17 are open, the material goes through lock chamber 15 and comes out through nozzle 12. Pressure gage 23, adjusted for a given threshold value, controls actuating cylinder 22 in one direction or the other, which either triggers the filling of chamber 20 by organic material coming from portion 18 of the pipe or the emptying of chamber 20 and driving of the material into portion 18 of the pipe. More precisely, when the pressure recorded by threshold pressure gage 23 is greater than the value of the predetermined threshold which corresponds to the desired pressure in the circuit at this location, for example 150 bars, a relatively slight resistance capable only of preventing a too sudden rise of piston 21, is applied by cylinder 22 on said piston. This permits filling of chamber 20, and a lowering of the pressure in portion 18 of the pipe, the lowering of pressure detected by pressure gage 23. When this pressure goes below the threshold value, this requires the application of a higher pressure from cylinder 22 and this causes the emptying of chamber 20 and the injection of the organic material stored in chamber 20 into portion 18 of the pipe. The control of cylinder 22 in response to a detected pressure by gage 23 may be done manually or via a computer which receives pressure signals and outputs signals to valves controlling the fluid pressure in cylinder 22.

Thus, the pressure of the material in the vicinity of the output nozzle 12 is regulated.

Unit 25 which includes a pressure gage 29 with two thresholds is also advantageously provided upstream from this system. When the pressure of the material pumped by pump 8 is too high, and is detected as higher than the high threshold of pressure gage 29, the stopping of pump 8 is ordered, as is the application on piston 27 by cylinder 28 of a relatively slight resistance pressure sufficient only to prevent a too sudden rise of said piston. Cylinder 26 is thus filled with material as a safety mechanism to relieve the output pressure until pressure gage 29 records the drop of pressure below its low threshold. Pump 8 is then immediately restarted and a higher pressure is applied to piston 27 by cylinder 28, a pressure which results in the emptying of cylinder 26. This may also be done manually or by a computer such as that described for the cylinder 22.

When the stopping of the supply of organic material at the output of nozzle 12 is desired, in particular when the depositing of bead 3 must be interrupted at the end of a straight portion of the glazing without the bead thereby being cut, to make the glazing pivot relative to nozzle 12 to allow continuation of depositing bead 3 along the following side, the following operations are triggered. The two valves 16 and 17 are simultaneously closed and compression/decompression system 13 is activated, i.e., the material available in the short length of pipe 11 between valve 17 and nozzle 12 is sucked into system 13 to prevent any continuation of supplying the bead.

By operations identical with that already described above, namely reading the pressure detected by pressure gage 23, filling chamber 20 if the pressure read is greater than the threshold pressure, or emptying the chamber 20 if the pressure read is less than the threshold pressure, the pressure of the material is maintained during this time at the desired threshold pressure, for example, 150 bars.

On restarting the deposition of bead 3 along the edge of a glass plate, i.e., when the glass plate and nozzle 12 are put in movement relative to one another, it is important that the material be supplied instantaneously with good delivery and at good pressure. At this moment, the two valves 16 and 17 are opened, but the material does not immediately flow, due to its inertia. However, this lack of instantaneous supplied material is offset by stored material discharged from the compression system 13. In addition, the low pressure, less than the threshold pressure, resulting from opening valve 17 is read by pressure gage 23, resulting in the application of relatively high pressure on piston 21 of chamber 20, causing injection into the circuit of the material enclosed in chamber 20. Thus, a regular delivery of material to the output of nozzle 12 is obtained.

Advantageously, for high pressures of very viscous materials, and also for considerable variations in the delivery at feeding, for example when the delivery drops momentarily to values approaching zero, the additional regulator 25 will perform a first smoothing.

Thus, a simple process is achieved, using little equipment and with great reliability, making it possible to provide a high delivery of a very viscous raw material on the order of 2 to 2.5 per minute with a practically perfect delivery regularity and without excessive mixings or shearing which could cause too great elevations of temperature, running the risk of degradations of the product. Thus, for example, when a bead is delivered for making a multiple glazing in which two glass plates are spaced 12 mm apart, said bead should weigh 90 g per meter. Thanks to this installation a bead can be produced whose weight is at least 90 grams and at the very most 95 grams.

FIG. 3 illustrates the second embodiment of the invention. In this FIG. 3 there is shown a drum 30 on top of which is a conical plate 31 provided with heating attachments (not shown). Conical plate 31 channels the material to a vane 32 of a reciprocating pump 33 actuated by a hydraulic cylinder 34. For its part, the conical plate is pressed on drum 30 by oleopneumatic cylinders 35. At the pump output, the material is conducted by a pipe 36 of the heating hose type to an extrusion chamber 37 which is closed at its upstream end by a heated piston 38 whose displacements are controlled by two symmetrical hydraulic cylinders 39 forming a hydraulic pump (not shown). The downstream end of chamber 37 is closed by an upstream valve 40 which, together with a downstream valve 41, delimits a lock chamber 42. This lock chamber 42 feeds the extrusion unit which comprises a nozzle 43 and a compression/decompression system 44 similar to system 13 of FIG. 2. Nozzle 43 is shown as being positioned above a glass sheet 45, shown here during rotation by a pivoting arm 47 on which it is immobilized by one or more suction cups 46 brought into contact with the glass at the moment of making a corner.

Preferably, piston 38 has a bronze ring 48 which slides in the cylindrical body of extrusion chamber 37. Since such a ring cannot guarantee a perfect sealing—which, moreover, is not required for a good functioning of the installation—a little material has a tendency to escape into space 49 of the extrusion chamber behind ring 48. To keep the material from accumulating in this space 49, the latter is advantageously provided with an escape hole. The case is the same with valves 40, 41 which are provided with escape holes (not shown here).

The device of FIG. 3 functions as follows: when the installation is started, valves 40 and 41 are closed. Reciprocating pump 34 is started so that extrusion chamber 33 is force fed. This forced feeding produces a pressure in the extrusion chamber 37 which makes the rods of pistons 39 recoil (to the left in FIG. 3). When the filling is completed, which is indicated by an end-of-travel indicator of one of the cylinders 39, pump 34 is stopped. At that moment, the cylinders 39 can be activated for extrusion and after a brief delay, taking into account the compressibility of the butyl rubber, valves 40 and 41 are opened. In extrusion chamber 37 the pressure is, for example, 200 bars whereas, because of losses of feedstock and especially the flow of the material through output nozzle 43, the pressure is generally less than 150 bars at valve 41. The actual pressures depend on the pressure exerted on cylinders 39, on the one hand, and on the cross section of the output nozzle, on the other hand.

When the extrusion is to be interrupted, for example to turn the glass sheet for passage of a corner, the hydraulic pump is stopped as soon as the two valves 41 and 42 are closed. Thus a certain amount of material is trapped in lock chamber 42, the material remaining at a suitable pressure.

To resume extrusion, it suffices to restart the hydraulic cylinder 39 and to reopen the valves. This reopening is preferably performed by beginning with the input valve 40 of the lock chamber, while taking into account the elasticity of the product, as a result of which extrusion occurs as though the two valves were opened at the same time.

Forced feeding of extrusion chamber 37 is preferably performed between two glazing operations, with valves 40 and 41 closed and the hydraulic cylinders free to move.

Advantageously, feed circuit 36 feeds two extrusion chambers 37 mounted in parallel. In this case, the input of each lock chamber is closed, for example by a valve although any equivalent switching system can be used. Further, each extrusion chamber 37 is closed by a valve, the valve of the "active" chamber, i.e., from which the extrusion emerges, then constituting the input valve of the lock chamber. Such a circuit offers the advantage of making it possible to use almost constantly the pump mounted on the drum which can feed the inactive chamber without disturbing the functioning of the unit. This embodiment is particularly useful for installations where the extrusion nozzle delivers practically continuously and/or installations where the delivery provided by the vane pump is relatively small which, for example, is the case with very "hard" butyl rubbers, selected to have a very good resistance to compression, for example, butyl rubbers whose viscosity expressed in Mooney degrees is greater than 120°, at the end of eight minutes at 40° C. (measured with a Mooney consistometer according to the recommendation ASTM D 1646-74), by further imposing a temperature of less than 100° C. on the rubber during its extrusion through the nozzle.

This good control of the bead guarantees a good quality of the multiple glazing.

Such perfectly regular beads of organic material can also be used in fields other than multiple glazings, in particular in the automobile field to provide seals, etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United S United States is:

1. An apparatus for forming a bead of organic material having a butyl rubber base and a viscosity greater than 35000 poises, comprising:
    a reciprocating pump having a conical heating piston which may rest on the organic material in a drum for heating and pumping the organic material;
    an output nozzle;
    a conduit connecting an output of said reciprocating pump with said output nozzle; and
    upstream and downstream valves in said conduit for defining a lock chamber in said conduit.

2. The apparatus of claim 1, wherein said upstream and downstream valves are spaced along said conduit by between 50 cm and 60 cm.

3. The apparatus of claim 1 including a first pressure gage positioned for detecting the material pressure in said lock chamber.

4. The apparatus of claim 3, wherein said lock chamber comprises a shunt portion of said conduit between said upstream and downstream valves, including a pressure regulator having a variable volume chamber connected to a mid-portion of said shunt portion.

5. The apparatus of claim 4 including means for varying the size of said variable volume chamber as a function of a pressure detected by said first pressure gage, comprising:
    a fluid cylinder actuated by said first pressure gage; and
    a piston of said fluid cylinder extending into said variable volume chamber.

6. The apparatus of claim 3 including a second pressure gage positioned for detecting the material pressure at said output of said reciprocating pump.

7. The apparatus of claim 3 including a pressure regulator having a variable volume extrusion chamber positioned in said conduit upstream of said upstream valve.

8. The apparatus of claim 7 including means for varying the size of said variable volume chamber as a function of a pressure detected by said first pressure gage, comprising:
    a fluid cylinder actuated by said first pressure gage; and
    a piston of said fluid cylinder extending into said variable volume chamber.

9. The apparatus of claim 8 including two of said extrusion chambers connected in parallel to one another.

10. The apparatus according to claim 8 wherein said piston has a bronze piston ring.

11. The apparatus according to claim 1 including a compression/decompression system connected to said conduit downstream of said downstream valve.

12. A process for forming a uniform bead of organic material having a butyl rubber base, with a viscosity greater than 35000 poises, comprising the steps of:
    using a reciprocating pump having a heating conical piston to heat and pump the organic material from a drum;
    conveying the material via a pipe to an output nozzle to form the uniform bead; and
    selectively storing the organic material in a lock chamber in said conduit.

13. The process of claim 12 including the step of adjusting the pressure in said lock chamber by varying the volume thereof.

14. The process of claim 12 including the step of adjusting the pressure of the material at the outlet of said reciprocating pump.

15. The process of claim 12 including the step of applying said bead to a multiple glazing so as to make an insert seal for said multiple glazing.

16. The process of claim 15 including the step of moving the glazing past said nozzle at approximately 30 cm per second.

17. The process of claim 12, wherein said bead has a viscosity, expressed in Mooney degrees, which is greater than 120° at the end of 8 minutes at 40° C.

* * * * *